US006947989B2

(12) United States Patent
Gullotta et al.

(10) Patent No.: US 6,947,989 B2
(45) Date of Patent: *Sep. 20, 2005

(54) SYSTEM AND METHOD FOR PROVISIONING RESOURCES TO USERS BASED ON POLICIES, ROLES, ORGANIZATIONAL INFORMATION, AND ATTRIBUTES

(75) Inventors: Tony J. Gullotta, Carlsbad, CA (US); Jeffrey S. Bohren, Tustin, CA (US); Liangtong Chen, Laguna Niguel, CA (US); Jeffrey C. Curie, Tustin, CA (US)

(73) Assignee: International Business Machines Corporation, Armonk, NY (US)

( * ) Notice: Subject to any disclaimer, the term of this patent is extended or adjusted under 35 U.S.C. 154(b) by 677 days.

This patent is subject to a terminal disclaimer.

(21) Appl. No.: 09/774,265

(22) Filed: Jan. 29, 2001

(65) Prior Publication Data

US 2002/0147801 A1 Oct. 10, 2002

(51) Int. Cl.[7] .............................................. G06F 15/173
(52) U.S. Cl. ....................... 709/226; 709/223; 709/229; 713/201; 379/201.12
(58) Field of Search ................................. 709/226, 225, 709/223, 229, 203; 713/201, 200; 379/201.12; 707/9; 705/8

(56) References Cited

U.S. PATENT DOCUMENTS

| | | | | | |
|---|---|---|---|---|---|
| 5,826,239 | A | * | 10/1998 | Du et al. ........................ 705/8 |
| 6,023,765 | A | * | 2/2000 | Kuhn ........................... 713/200 |
| 6,052,723 | A | * | 4/2000 | Ginn ........................... 709/226 |
| 6,055,637 | A | * | 4/2000 | Hudson et al. .............. 713/201 |
| 6,067,548 | A | * | 5/2000 | Cheng ...................... 707/104.1 |
| 6,085,191 | A | * | 7/2000 | Fisher et al. .................... 707/9 |
| 6,088,679 | A | * | 7/2000 | Barkley ........................... 705/8 |
| 6,182,142 | B1 | * | 1/2001 | Win et al. .................... 709/229 |
| 6,202,066 | B1 | * | 3/2001 | Barkley et al. ................. 707/9 |
| 6,237,036 | B1 | * | 5/2001 | Ueno et al. ................... 709/225 |
| 6,408,336 | B1 | * | 6/2002 | Schneider et al. ........... 709/229 |
| 2002/0156904 | A1 | * | 10/2002 | Gullotta et al. ............. 709/229 |
| 2002/0169876 | A1 | * | 11/2002 | Curie et al. ................. 709/229 |

FOREIGN PATENT DOCUMENTS

EP         0697662 A1 *  2/1996

OTHER PUBLICATIONS

Hitchens et al, "Design and Specification of Role Based Access Control Policies", IEEE, Aug. 2000.*
Tari et al, "A Role–based Access Control for Intranet Security", IEEE, 1997.*
David Ferraiolo and Richard Kuhn, Role–Based Access Controls, Proceedings of the 15th NIST–NSA National Computer Security Conference, Baltimore, Maryland, Oct. 13–16, 1992.
NIST High Integrity Software Systems Assurance Webstie with link to NIST Research in Role Based Access Control http://hissa.nist.gov.

* cited by examiner

Primary Examiner—Philip B. Tran
(74) Attorney, Agent, or Firm—Foley & Lardner LLP

(57) ABSTRACT

A method for provisioning users with resources is disclosed. The method includes the steps of establishing a set of attributes, organizational information, and user roles, and defining a plurality of resource provisioning policies based on selected attributes and user roles. The method also includes the steps of receiving attribute information, organizational information, and user role information for a particular user or resource, determining which resource access policies are applicable to the user based on the received user role information and attribute information, and provisioning the user with resources based on the applicable resource access policies. The resources to be provisioned include "hard" resources, such as telephones, computers, personal digital assistants, desks, chairs and the like, as well as "soft" resources. such as e-mail and voice mail accounts, application programs, databases, files, folders, the like.

19 Claims, 11 Drawing Sheets

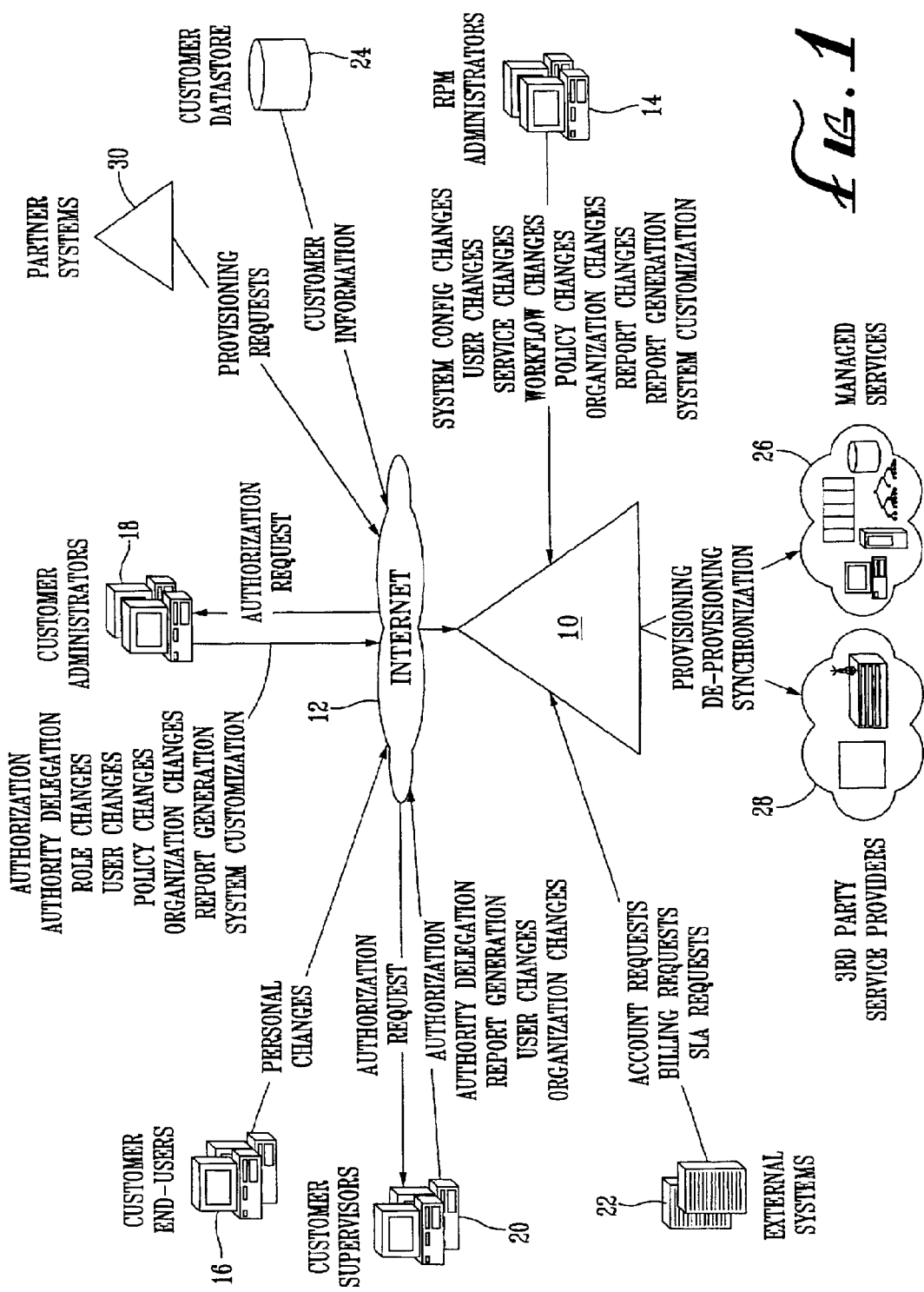

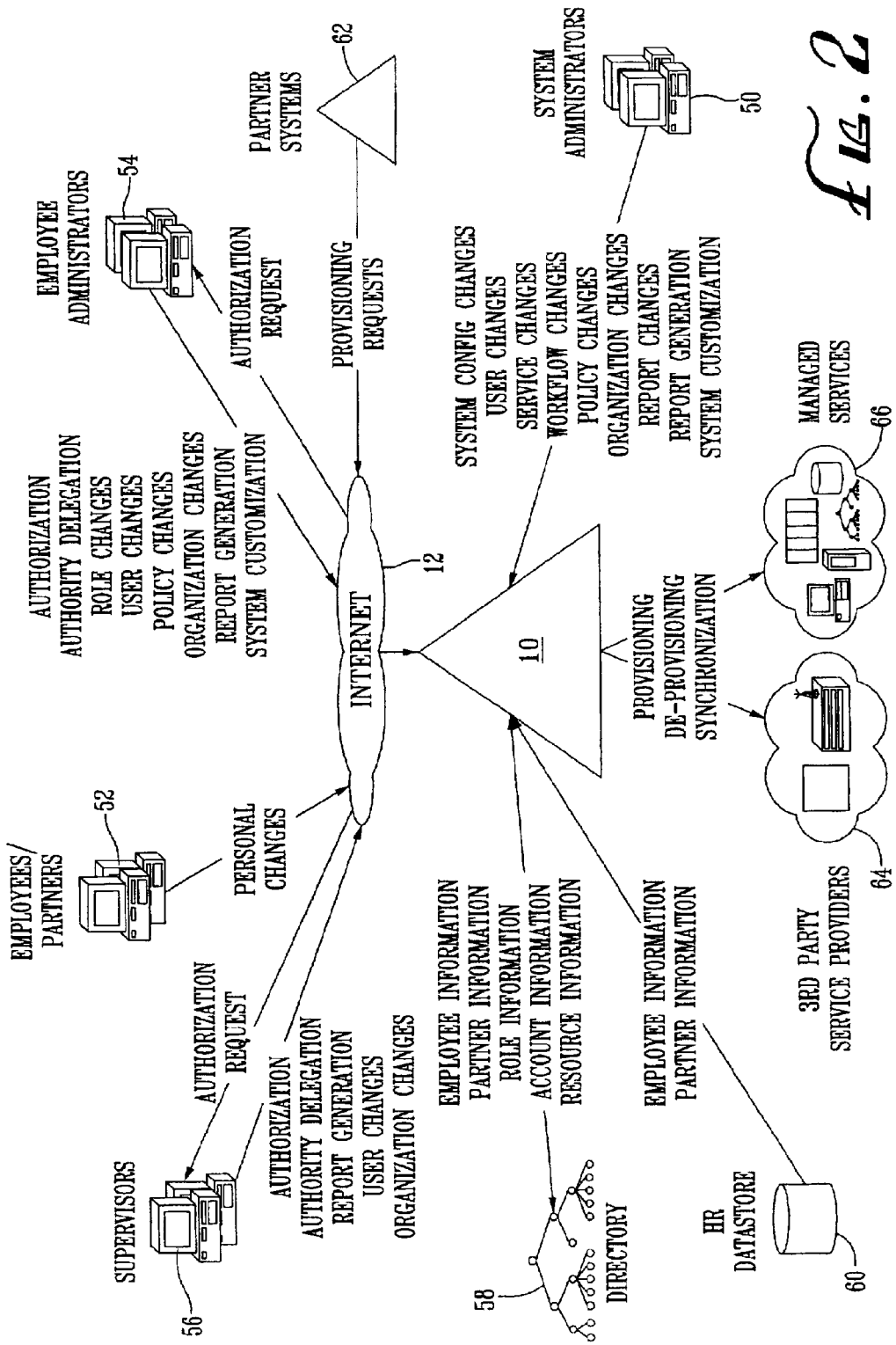

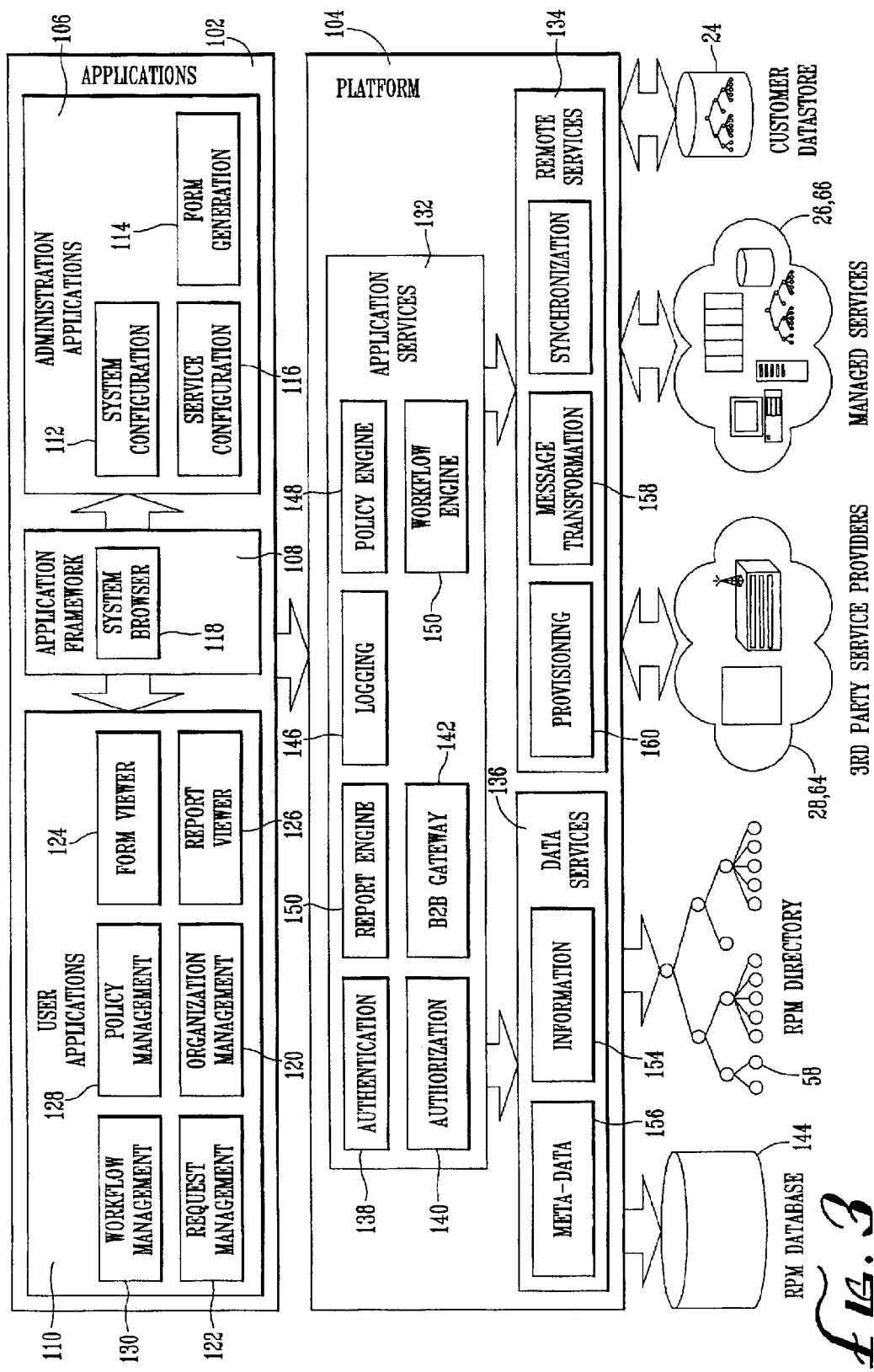

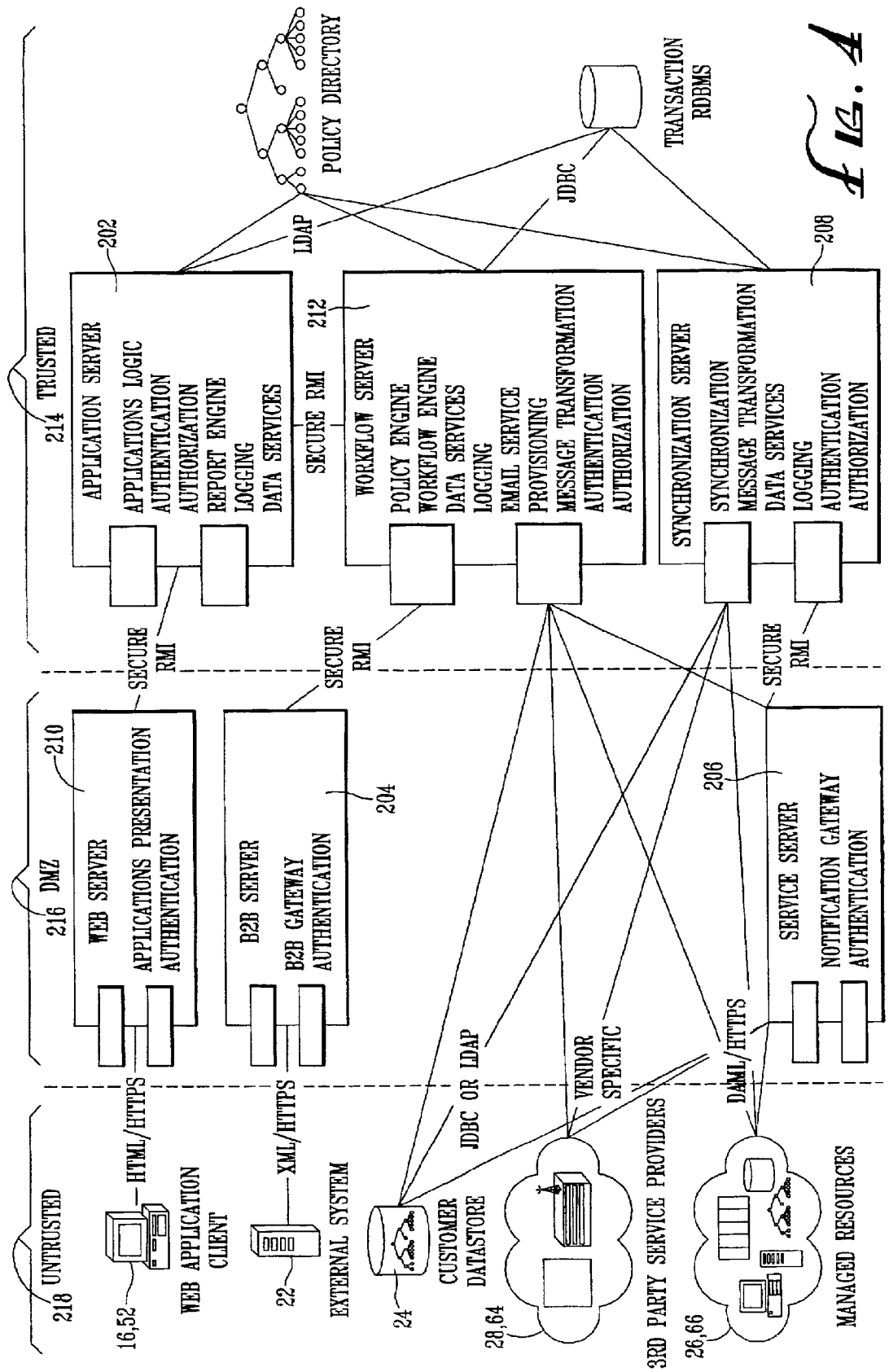

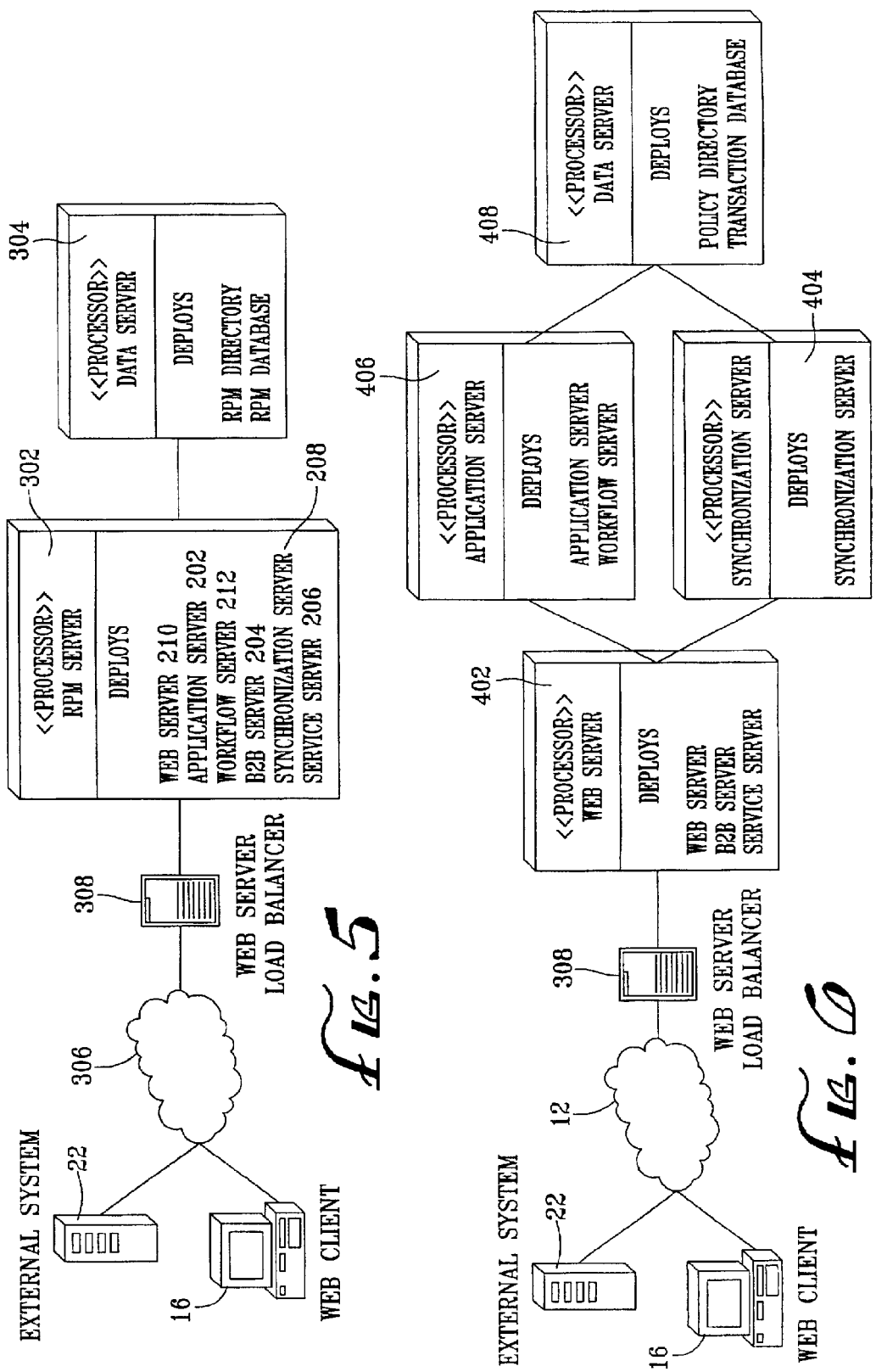

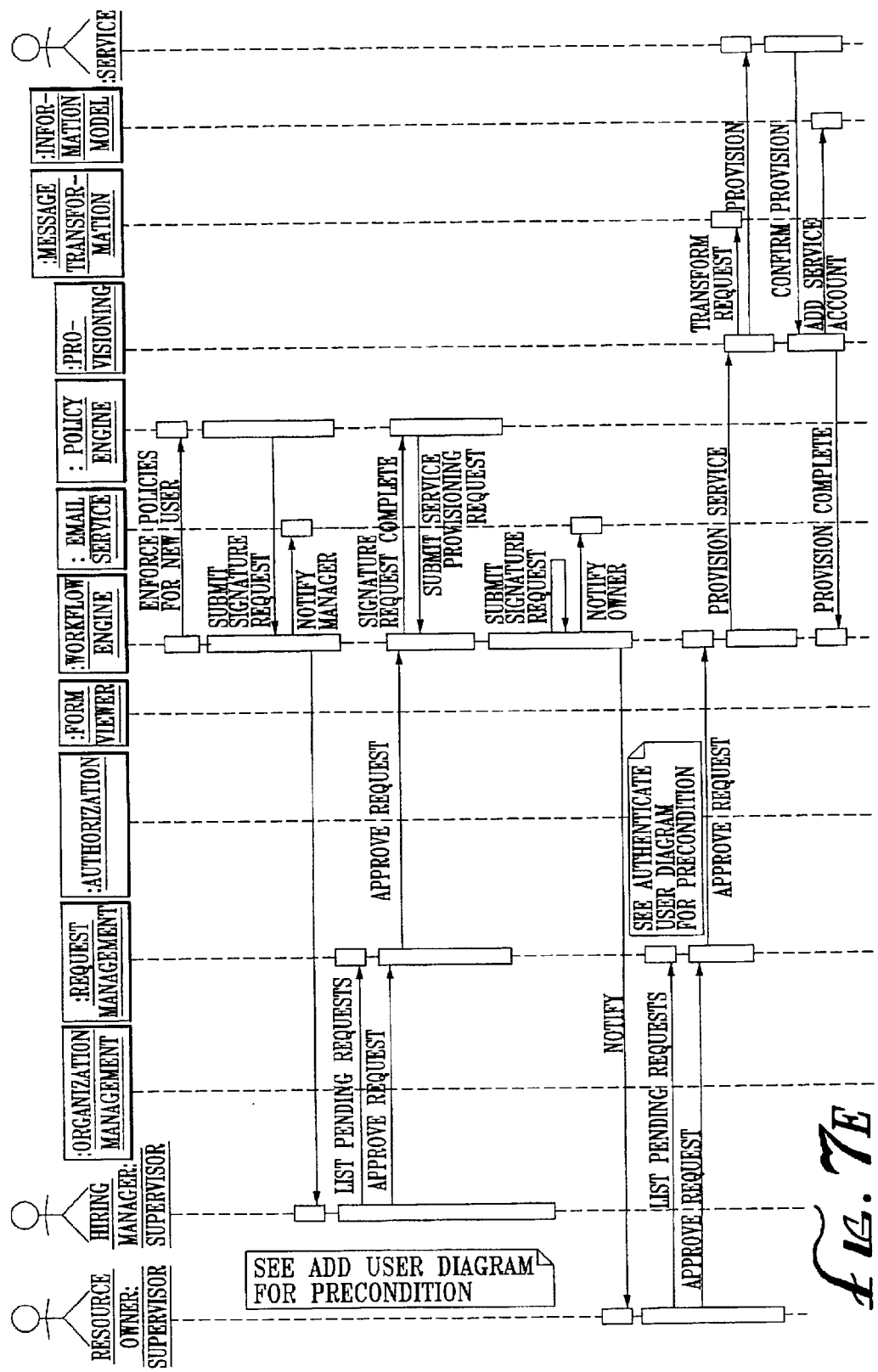

SYSTEM AND METHOD FOR PROVISIONING RESOURCES TO USERS BASED ON POLICIES, ROLES, ORGANIZATIONAL INFORMATION, AND ATTRIBUTES

BACKGROUND OF THE INVENTION

1. Field of the Invention

The present invention relates, generally, to the administration of user accounts and resources, and, in preferred embodiments, to systems and processes for provisioning users with resources based on policies, roles, organizational information, and attributes.

2. Description of Related Art

A common use of communication networks is to provide users access to network resources such as software, electronic data, or files in storage systems or databases connected to the network. As the number of users on a given network increases, there is often a need to control user access rights to resources on the network.

Network environments often involve a variety of network users, where the users may be grouped or categorized by a relation or role that the user serves in the environment. For example, in an engineering or technical development company environment, users of the company's computer network may include company officers, directors, managers, engineers, technical support staff, office support staff, accounting department staff, information technology (IT) department staff, contractors, consultants, temporary employees or other relation-based or role-based groups or categories of network users. Other companies, organizations or network environments may have other relation or role-based groups of users. Each user may have a need to access certain network resources in connection with the user's relation or role. In addition, it may be desirable to restrict users with certain relations or roles from access to certain resources, for example, for security, privacy or other reasons.

Depending on the network environment, other types of resources may also be allocated to (or restricted from) users, based on the user's relation or role in the environment. For example, in the engineering or development company environment described above, users may be allocated such resources as telephones, telephone accounts, computers, Internet accounts, e-mail accounts, office equipment and supplies, laboratory or engineering equipment and supplies, or other resources, based on the user's role or relation with the company.

In many conventional businesses or organizations, specific personnel perform the function of provisioning users according to their roles. For example, an office administrator may place an order with the organization's IT department to have a computer, telephone, voice mail, e-mail, and certain applications and databases available on the day a new user joins the organization. Individuals from the IT department would then manually set up these resources. Other office personnel may bring desks, chairs, and cabinets from storage and set up the user's office. Over the course of time, the user's relationship or roles within the organization may change, for example, as the user is transferred, promoted, demoted or terminated from the organization. As a user's relationship or role with the organization changes, the user's needs or rights to access resources may change.

The burden on the office administrator and office personnel to manually administer user access to resources in the above example is typically dependent on the size of the organization (the number of users) and the rate at which users join or leave the organization or otherwise change roles. To improve efficiency and reduce the burden on the office administrator and office personnel, some organizations have used software applications which automate or partially automate some of the tasks relating to provisioning certain, limited types of resources to users.

Role Based Access Control (RBAC) is one form of automatic provisioning that has become commercially available. RBAC provides permissions (access rights) to a user to access certain accounts (files, web pages, etc.) available over the network, based on a person's role in the organization. For example, a file or folder may be viewed only by its creator, or may be accessible to a larger group of users through an organization's network, depending on the permission rights established for that file or folder. In conventional RBAC systems, these permissions are based on a person's role within the organization.

However, modern organizations may be structured along several intersecting lines. For example, organizations may be structured according to title (presidents, vice-presidents, directors, managers, supervisors, etc.), technology (electronics, mechanical, software, etc.), project (product A, B, C, etc.), location (Irvine, N.Y., etc.) and the like. A single user may appear in several or all of these organizational structures, and thus may be in a somewhat unique overall role as compared to other users in the organization. Because this may require that many users be provisioned uniquely, many unique roles would have to be defined in the system to automate such provisioning. Furthermore, conventional RBAC only provisions "soft" resources such as accounts, applications, databases, files, Web pages, and the like, as opposed to "hard" resources such as telephones, computers, desks, and the like.

SUMMARY OF THE DISCLOSURE

Therefore, embodiments of the present invention relate to systems and methods for provisioning users based on policies, user roles and attributes, which reduces or minimize the number of unique roles which must be created.

Further embodiments of the present invention relate to systems and methods for provisioning users based on policies which allow both "soft" and "hard" resources to be provisioned.

Yet further embodiments of the present invention relate to systems and methods for provisioning resources in bundles.

Yet further embodiments of the present invention relate to systems and methods for provisioning users based on policies that can take various process paths that are established as a result of the entry of user parameters.

Yet further embodiments of the present invention relate to systems and methods for provisioning users based on policies which may require information or authorization from another person.

These and other advantages are accomplished according to a method and system for provisioning users with resources. The method and system involves establishing a set of attributes and user roles, and defining a plurality of resource access policies based on selected attributes and user roles. The method and system also involves receiving attribute information and user role information for a particular user or resource, determining which resource access policies are applicable to the user based on the received user role information and attribute information, and provisioning the user with resources based on the applicable resource access policies.

The resources to be provisioned include "hard" resources as well as "soft" resources. "Soft" resources may include e-mail and voice mail accounts, application programs, databases, files, folders, the Internet, Web pages, organizational Intranets, messages to third parties, digital certificates for enabling the user to access encrypted resources, the capability to order products over the Internet, the ability to order a corporate credit card, access to financial services providers, and the like. In addition, users may be provisioned with "hard" resources such as telephones, computers, cellular telephones, pagers, personal digital assistants, desks, chairs, file cabinets, other physical components, and the like. In further embodiments, multiple resources may be bundled in one or more groups, such that users may be provisioned with resource bundles.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 1 is a diagram of an external view of an Application Service Provider (ASP) environment embodiment of the present invention.

FIG. 2 is a diagram of an external view of a Corporate Enterprise environment embodiment of the present invention.

FIG. 3 is a diagram of logical architecture of a system according to an embodiment of the present invention.

FIG. 4 is a diagram of a component arrangement of a system according to an embodiment of the present invention.

FIG. 5 is a diagram of an example deployment of a system according to an embodiment of the present invention.

FIG. 6 is a diagram of another example deployment of a system according to an embodiment of the present invention.

FIGS. 7A–E are sequence diagrams of interactions relating to authenticating a user, adding a user, provisioning a service for a user, provisioning services for a new user based on policy, and synchronizing services and enforcing policy violations.

DETAILED DESCRIPTION OF PREFERRED EMBODIMENTS

Figure 7A:
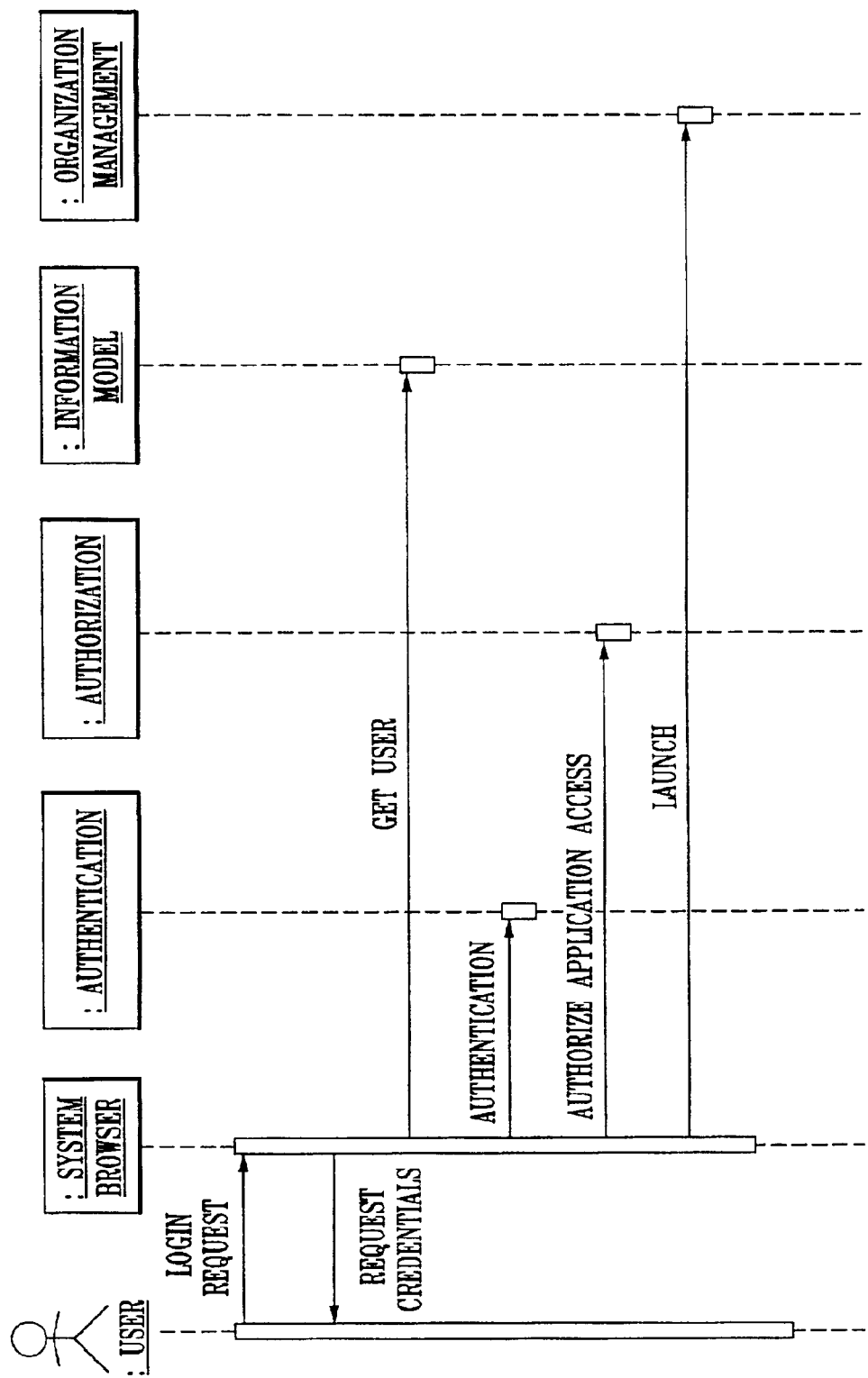

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

System Overview

As described above, embodiments of the present invention relate to a system operable on a communication network for provisioning users with resources based on policies, roles and attributes. Embodiments of the present invention will be generally referred to herein as a resource provisioning management (RPM) system, or simply "the system."

The system may be implemented with software applications and modules deployed on various processor or computer systems connected for communication over one or more network or non-network links. As described in more detail below, the processors in which the modules and applications are deployed may differ from system embodiment to system embodiment. In addition, the types of users, administrators and other entities that interact with the system may differ from system embodiment to system embodiment. Preferred embodiments of the system are designed to provide a high level of flexibility to accommodate the needs of a variety of potential applications of use.

Two representative examples of system environments in which embodiments of the present invention operate are shown in FIGS. 1 and 2, respectively. FIG. 1 shows a generalized representation of an Application Service Provider (ASP) environment embodiment, while FIG. 2 shows a generalized representation of an Enterprise environment embodiment of the system. In each of FIGS. 1 and 2, a platform computer system 10 is coupled for communication with a plurality of user computers, administrator computers and other entities over a network 12, depending upon the needs of the system. Further entities, including external systems, databases and directories, third party service providers, managed services and system administrators may be coupled for communication to the platform system 10 through the same network or through other networks or dedicated communication links, depending upon the needs of the system. While a number of such entities are shown and described with respect to embodiments disclosed herein, it will be understood that further system environment embodiments of the invention need not include all of the entities described herein.

The network environment may also include one or more network servers, routers and other network structure and devices (not shown). A network environment may comprise a local area network (LAN), for example, within an office or building. In other embodiments, the network environment may comprise a wide area network (WAN) including, but not limited to, the Internet.

The platform system 10 may be implemented, for example, with one or more processors or computers which include or operate with associated memory and software modules and applications to carry out various functions described herein. The platform system 10 carries out various functions associated with provisioning users with resources based on policies, roles, organizational information, and attributes, as described below. Further functions may be carried out on processors or computers associated with the users, administrators, and service providers, for example, implemented by software running on those computers, as described below. Embodiments of the present invention can therefore run on a cluster of computers or on a single computer. These computers may or may not have multiple processors.

Users, and users acting in administrator roles, may operate computers which may include suitable processors, memory devices and user interface devices, such as, but not limited to, display devices, keyboards, mouse devices, or the like, to allow users to obtain and communicate information over the network or other communication link. Suitable software may be stored at, or be accessible to, the user and administrator Web browsers or computers, to provide user and administrator interface functions and to allow communication of electronic information and content, such as data, files, programs and other software over the network, in accordance with well known network communication technology. In addition, software for implementing functions associated with the user and administrator according to embodiments of the present invention may also be stored at, or be accessible to, the user and administrator Web browsers, respectively.

The system 10 provides a platform for defining policies and provisioning services to a user interacting with the system, or a user interacting with the network on which the system is operating. The system may designate and track the types of services as well as the types of access to these services for a large number of users. In the generalized examples of FIGS. 1 and 2, the platform system 10 may receive requests for services from user computers. The platform system 10 may also receive information from administrator computers relating to, for example, authorizations of users' requests or changes in users, policies or roles. The platform system 10 may also provide information to the administrator Web browsers or computers, including, for example, reports on operation and service usage. The platform system 10 may provide requests, instructions, or other information to service providers or managed services computers related to providing services to the users, based on user requests, policies, roles, organizational information, and attributes. The platform system 10 may control access to services, such as data, files, programs or other electronic information from database or storage systems to the users, based on user requests, policies, roles, organizational information, and attributes.

As described above, a system according to the FIG. 1 embodiment is deployed in an ASP environment. An ASP may be described as an organization that deploys, hosts and manages access to applications such as software and other resources to multiple parties from a centrally managed facility. The applications are typically delivered over networks, including, but not limited to the Internet, on a subscription basis.

In the ASP environment, one or more users within the ASP may be designated as RPM system administrators 14 with access rights greater than other users at the same company. RPM system administrators, like other users at the same company, are capable of performing operations in accordance with policies put in place by the ASP customer, which may be based on role and organizational information for each user. However, these RPM system administrators are additionally provided with certain system configuration responsibilities, including selecting the processors on which certain modules or applications of the system are deployed, as described below. In addition, an RPM system administrator may be able to manage, for example, organizations, users, services, roles, workflow rules, policies and the system itself. An RPM provisioning system administrator may also generate reports to audit the current and historical status of the system, and may also be authorized to manage different portions of the system's data by being granted permission to access such data. The responsibilities of any given RPM system administrator may range from organization management only, to entire system management, depending upon the permission or access rights provided to the given RPM system administrator.

The system in FIG. 1 may also interface, for example, with one or more Customer End-Users 16, Customer Administrators 18, and Customer Supervisors 20. In the illustrated example, the interfaces for the Customer End-User 16, Customer Administrator 18, and Customer Supervisor 20 are Web enabled for connection over the Internet 12.

A Customer End-User 16 is a user having access to resources in accordance with policies put in place by the customer A Customer End-User 16 may be an employee of an ASP's customer who is provided access to certain ASP resources. A Customer End-User 16 would typically be authorized only to perform self-administration of its own personal and account information stored in a Lightweight Directory Access Protocol (LDAP) Directory server (not shown in FIG. 1) by communicating requests for provisioned services/resources over the network using a Web browser.

A Customer Administrator 18, as shown in FIG. 1, is also a user having access to resources in accordance with policies put in place by the customer. A Customer Administrator 18 may be an employee of an ASP's customer who is responsible for administering portions of a customer's organization, such as managing organizational and user information and, is therefore provided with permissions or access rights to appropriate system data to perform such functions. For example, a Customer Administrator may define and manage use of user roles and policies and, thus, may be provided with permission or access rights to the LDAP Directory Server. Thus, a Customer Administrator may define or change users, roles, policies, organization hierarchy or the like. A Customer Administrator may also generate reports to audit the current and historical status of the system, and therefore may be provided with permission or access rights to the RPM system server containing a report engine 150 (see FIG. 3). A Customer Administrator 18 typically would be authorized to manage different portions of the system's data by being granted permission to access such data. The responsibilities of a Customer Administrator 18 may range from organization management only, to entire system management, depending upon the permission rights granted to the Customer Administrator.

A Customer Supervisor 20, as shown in FIG. 1, is also a user having access to resources in accordance with policies put in place by the customer. A Customer Supervisor 20 may be an employee of an ASP's customer who is responsible for managing or supervising groups of users in the customer organization. A Customer Supervisor 20 may delegate responsibilities to another Customer Supervisor. In preferred embodiments, the delegation of responsibility may be authorized for a pre-defined period of time. A Customer Supervisor 20 may make changes to a roster of current users and approve requests made by users, where such requests require approval. A Customer Supervisor 20 may also generate reports to audit the current and historical status of the system. It should be understood that, in preferred embodiments, reports are not stored. Rather, they are generated as needed, and if a user wants to store a report, it would have to be saved to the user's Web browser.

FIG. 1 also indicates that the system may interface with one or more External Systems 22. An External System 22 may be any ASP system that may wish to retrieve customer or managed resource information that is managed by the system 10. This may be accomplished via a direct interface to an RPM directory (see reference character 58 in FIG. 3) used by the system 10 to store such information.

As illustrated in FIG. 1, the system may also interface with one or more Customer Datastores 24. In preferred embodiments, this interface is Internet capable. A Customer Datastore 24 may be a relational database or directory that stores ASP customer information. Note that customer-relevant data such as the customer's organization, roles, account information, and user information is stored in the directories within the Customer Datastores 24, while in-progress workflow information, audit logs, historical audit trail information (e.g., requests that have been approved), system state information (e.g. workflow state, requests that have not yet been approved), and information about remote services is stored in the databases within the Customer Datastores 24.

The system 10 may also interface, for example, with a Managed Service 26, as shown in FIG. 1. In preferred embodiments, this interface is Internet capable. A Managed Service 26 may be an application, device or datastore that the system 10 proactively manages. A Managed Service may comprise a network device that has an account maintenance system, such as an RPM system, an operating system, an application (e.g., a human resources (HR) system, enterprise resource planning (ERP) system, etc.), public key infrastructure (PKI) certificates, databases, financial services, and the like. The Managed Service's system may function independently. Thus, the datastore for the system 10 and that of a Managed Service may be synchronized periodically or at defined or irregular intervals, for example, to update the datastore.

The system may also interface, for example, with a Third Party Service Provider 28, as shown in FIG. 1. In preferred embodiments, this interface is Internet capable. A Third Party Service Provider 28 may be an external organization that provides services that may be provisioned through the system 10. A Third Party Service Provider 28 may be, for example, a credit card service that provides credit cards or credit accounts that are provisioned through the system 10. As another example, a Third Party Service Provider 28 may be a telephone service company that provides telephone line accounts that are provisioned through the system 10. It should be understood that these are merely representative examples. Many other types of services may be provided by a Third Party Service Provider in accordance with further system embodiments.

The system 10 may also interface, for example, with a Partner System 30, as shown in FIG. 1. In preferred embodiments, this interface is Internet capable. A Partner System 30 may be similar or identical to the system 10, but used by a business partner or customer and integrated into the system 10. Thus, the Partner System 30 represents a system-to-system interface which, in preferred embodiments, may be used to provide the seamless integration of multiple systems.

As described above, a system according to the embodiment of FIG. 2 is deployed in an Enterprise environment. An enterprise may be any organization that desires or requires management and administration of its resources, including, but not limited to, companies, firms, educational organizations, governmental organizations, or other groups or associations. In the FIG. 2 embodiment, the system 10 supports the same capabilities described above with respect to FIG. 1, but with some differences for different kinds of users.

For example, the system 10 may interface with a System Administrator 50 in a manner similar to the RPM system administrator interface described with respect to FIG. 1. The System Administrator 50 may be an employee of the Enterprise, and may have responsibility for configuring the system. A System Administrator 50 may be able to manage organizations, users, services, roles, workflow rules, policies, and the system itself. A System Administrator 50 may also generate reports to audit the current and historical status of the system. A System Administrator 50 may be authorized to manage different portions of the system's data by being granted permission to access such data. The responsibilities of a System Administrator 50 may range from organization management only, to entire system management.

Instead of Customer End-Users, Customer Administrators and Customer Supervisors described with respect to FIG. 1, the environment in FIG. 2 includes Employees (or Partners) 52, Employee Administrators 54, and Supervisors 56. Each may interface with the system 10, and are preferably web enabled for interfacing with system 10 over the Internet. An Employee may be an employee of the enterprise. An Employee 52 is a user having access to resources in accordance with policies put in place by the enterprise. Typically, an Employee may only be authorized to perform self-administration of the Employee's own personal information.

An Employee Administrator 54, as shown in FIG. 2, may be an employee of the Enterprise who is responsible for Enterprise employee administration. An Employee Administrator 54 is a user having access to resources in accordance with policies put in place by the Enterprise, who is responsible for managing the Enterprise's organizational and user information. This may involve defining, changing and managing user roles and policies. An Employee Administrator 54 may also generate reports to audit the current and historical status of the system. An Employee Administrator 54 may be authorized to manage different portions of the system's data by being granted permission to access such data. The responsibilities of an Employee Administrator 54 may range from organization management only, to entire system management.

An Enterprise Supervisor 56 may be an employee of the Enterprise who is responsible for managing groups of users within the Enterprise. Typically, an Enterprise Supervisor 56 may make changes to users and approve requests made by users. An Enterprise Supervisor 56 may also generate reports to audit the current and historical status of the system.

FIG. 2 also indicates that the system may interface with a Directory 58. A Directory 58 may be used by the system to store organizational information, user or employee information, partner information, role information, account information, resource information or the like. In one embodiment, the Directory is an LDAPv3 directory. The directory may be supplied by an Enterprise customer, or may be installed solely for the system 10.

As illustrated in FIG. 2, the system may interface with a Human Resources Datastore 60. A Human Resources Datastore 60 may be a database or directory that stores Enterprise employee and partner information.

The system 10 may also interface with a Partner System 62, Third Party Service Providers 64 and Managed Services 66, in a manner similar to that described above with respect to the Partner Systems 30, Third Party Service Providers 28 and Managed Services 26 in FIG. 1.

The system 10 in FIGS. 1 and 2 may be used to manage the provisioning of a variety of services or resources to users. A service may be any type of resource that may be accessed one or more times by users of the system. For example, a cellular telephone account or an account with a credit card company may be services. Using these services as examples, the system may, for example, designate that certain users have access to a cellular telephone account and a credit card account, and may track the usage by the user of these accounts. The system may also set various rules and policies regarding the use of these accounts by the user, depending on the status of the user.

Using the system, an organization may provision, or allocate, services to a user within the organization based on defined policies, organizational information, attributes, and the role of the user in the organization. The policies, or rules, may be pre-defined for the organization based on the needs of the organization and incorporated into the system. The policies may be flexible enough to account for the various roles within the organization and the services each role requires. For example, assume an organization hires a new employee in the capacity of System Administrator. Using the system, several actions may be automatically initiated. For example, if a pre-set policy for the organization provides that each employee receives regular telephone service, a regular telephone, and an e-mail account, then upon the hiring of a new System Administrator, the system will automatically notify the appropriate parties to set up a regular telephone account and an e-mail account for the System Administrator and deliver a regular telephone to the System Administrator's office. Assume also that a pre-set policy for the organization is that each System Administrator has access to all system databases. The system will then automatically grant the System Administrator access to all system databases.

For purposes of illustration only, assume that the same organization hires a new employee in the capacity of Outside Salesperson. As before, because of the policies that have been pre-defined for the organization, including, but not limited to, the policy that each employee receives regular telephone service, a regular telephone, and an e-mail account, the system automatically notifies the appropriate parties to set up a regular telephone account and an e-mail account for the Outside Salesperson and deliver a regular telephone to the Outside Salesperson's office. However, if the organization has a pre-defined policy that Outside Salespersons do not have access to all system databases, as do System Administrators, then access to these databases may be automatically denied by the system to the Outside Salesperson. If, however, the organization has a pre-defined policy that all Outside Salespersons receive cellular telephones, then the system may automatically set up a cellular telephone account for and order delivery of a cellular telephone to the Outside Salesperson.

Preferred embodiments of the system described herein perform these actions automatically based on the role of the person within the organization and policies that are pre-defined for the organization. The policies may be based on the needs of the organization and the requirements of each particular role within the organization, such that resources may be provisioned to each user to meet the needs and the requirements of the user's particular role in the organization.

System Logical Architecture

A logical architecture view of applications and modules of a system 10 according to one embodiment of the present invention is shown in FIG. 3. As shown in FIG. 3, an example system embodiment may be characterized as a group of software modules with interfaces that allow the modules to collaborate with each other in order to implement the features of the system. In preferred embodiments, each module may be a self-contained unit of software that may be replaced within the system without compromising the integrity of the system, as long as the interface of the replaced module is maintained. While the interface to the module may remain consistent, the internal architecture of each module may vary, depending upon the application of use.

The modules may be grouped into an applications subsystem 102 and a platform subsystem 104. The applications subsystem 102 is directed toward applications that help a user or an administrator perform specific functions and, thus, may be implemented in software running on computers operated by users or administrators. The platform subsystem is directed toward services and utilities for enabling applications to interact with directories and databases containing the state of a network and the services on that network that are being managed. The platform subsystem may be implemented in software running on the platform computer system.

Figure 8:
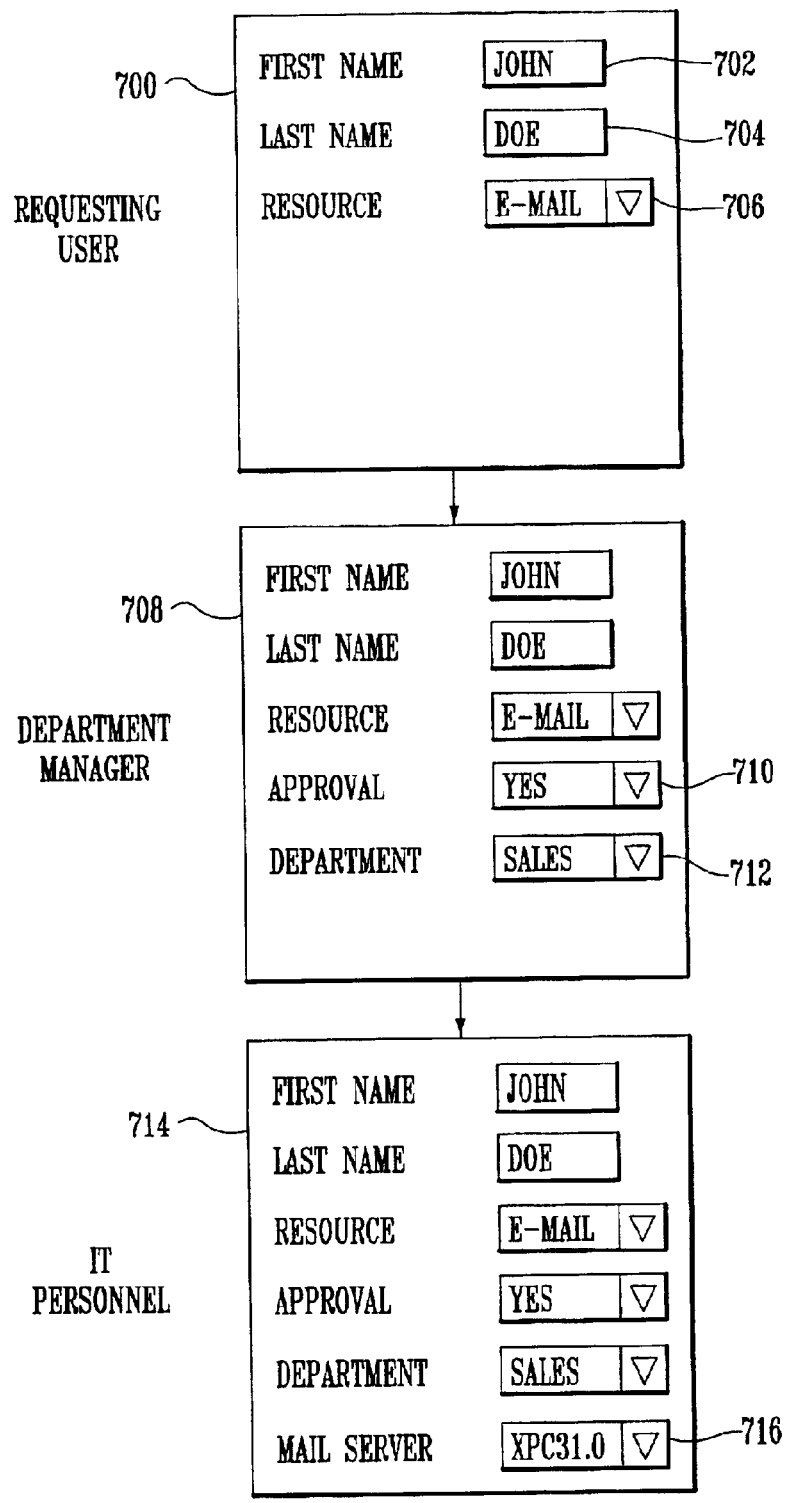
FIG. 8 is diagram of graphical interfaces in a sequence relating to a provisioning process.

The applications subsystem 102 may include, for example, administration applications 106, application framework 108 and user applications 110. Administration applications 106 are applications used by an administrator, via the network, for various administration purposes. These applications may include one or more System Configuration applications 112, which provide an interface to allow an administrator to configure certain properties of the system. For example, the administrator interface may allow administrators to make system configuration settings, including, but not limited to, directory communication settings, logging properties, e-mail service settings, and garbage collection settings. The System Configuration applications 112 may include an interface to a Form Generation application 114, invoked to provide custom forms for data managed by the system. An example of such a form is illustrated in FIG. 8.

The Form Generation application 114 may also allow an administrator to create custom forms to be displayed in user and administrator applications. The Form Generation application may comprise a graphical user interface builder that associates system data attributes with graphical controls, which may include, but is not limited to, a "What You See Is What You Get" (WYSIWYG) graphical user interface builder.

The administration applications 106 may also include one or more Service Configuration applications 116, which provide an interface to allow administrators to configure certain properties of a service managed by the system. Examples of properties of a managed service include, but are not limited to, network location (IP address and port number), encryption for use and management, administrator login (ID and password), and management protocols.

In one preferred embodiment, a service may be bundled as a set with other services that are related through administrator-defined dependencies defined through the administrator interface. The Service Configuration applications 116 may include an interface to the Form Generation application 114 to provide custom forms for the account information to be used in the User Management web user application, which is the Web-based user interface that allows a user to add, modify, and delete other users.

The application framework 108 comprises a framework that integrates administrator and user applications. The application framework may include one or more System Browser applications 118, accessible by the system administrator, that preferably provide a graphical display of the entire managed contents of the system in a format that is easy to use.

The user applications 110 are applications used by an end-user, over the network, for various purposes. The user applications 110 may include one or more Organization Management applications 120 that preferably provide a graphical display of an organization's hierarchy of data in a format that is easy to use. From this interface, organizational units, locations, business partner organizations, users, system roles and organizational roles in the form of a tree view can be constructed and altered.

Depending upon the access level of the user, different areas of the hierarchy can be viewed or modified by the user. In embodiments in which the system manages multiple organizations, a user in a given organization will be restricted from accessing other organizations' data. However, a system administrator (not to be confused with an employee administrator or a customer administrator, described below) may be provided with access rights to all organizations' data.

The user applications 110 may include one or more Request Management applications 122 that provide an interface for the user to review and manage change requests pending within the system. A change request is a request to change one or more attributes of a user, or a request to change one or more attributes of a service belonging to that user. The interface may allow, for example, users acting in a supervisory role to approve or disapprove change requests.

The user applications 110 may also include one or more Form Viewer applications 124 that dynamically display forms as they are designed by the Form Generation administration application 114. The access level of the user determines which form, if any, the Form Viewer application will display in different situations. One or more Report Viewer applications 126 may be included for allowing a user to instruct a Report Engine in the platform subsystem 104 to execute predefined reports, and for displaying the results to the user. The access level of the user determines which reports the Report Viewer will provide. In addition, the user applications include applications for allowing a user to submit a request for provisioned services.

The user applications 110 may also include a Policy Management application 128 that provides an interface for defining policies that control the provisioning of services to users. In addition, constraints on individual attributes of services may be defined. The policies determine an association between the users and the services or resources, and constraints on those services provisioned to the users, based on attributes and user roles. The policies may define one or a series of approvals that are required before provisioning a given service or any service to a user. For example, such approvals may be required from one or more other users acting in a supervisory role. Policies may require one or more approvals if an attribute constraint is violated. The approvals may be defined using a Workflow Management application 130, which provides an interface for defining the approval process needed for a request in the system.

As described above, the platform subsystem 104 includes service and utility modules that enable various applications of the system to interact with directories and databases that hold information relating to the state of the system and services available over the network. The platform subsystem 104 may include, for example, application services 132, data services 134 and remote services 136. In preferred embodiments, the platform modules are designed to be as independent as possible of any domain-specific information. This enables the platform to be easily applied to a different domain and support a new set of applications without (or with minimal) re-architecture.

The application services 132 includes modules that may be used by several other system applications (client applications) to perform a service. These service modules may provide a separate and independent set of capabilities to their client applications. The applications services modules 132 may include an Authorization module 138 for providing a set of authentication implementations that may be used by client applications. Such implementations may include, but are not limited to, simple password authentication techniques or X.509 certificate authentication.

The application services 132 may also include an Authorization module 140 that provides an interface for authorized users to define authorization rules, and enforces those rules as client applications attempt operations on the system, such as requesting services or data. These rules may apply to accessing data within the system, as well as to operations that can be applied to the system data, such as add, modify, or delete operations.

A Business-To-Business (B2B) Gateway module 142 may be included to provide an interface to an external access management system such as the RPM system described herein, or a comparable third-party system.

The B2B Gateway module 142 may provide an external system the ability to add, modify, delete and query user information. In preferred embodiments, these functions may be performed through an open protocol such as, but not limited to, secure hypertext transport protocol (HTTPS) to enable secure communications through the Internet. In preferred embodiments, requests made by external systems to carry out such functions may be stored in an RPM database or other storage facility 144 for auditing purposes.

The applications services 132 may also include a Logging module 146 that provides a utility for logging information, such as alarms and historical events, into persistent storage (e.g. the RPM database 144) associated with the platform system.

The applications services 132 may also include a Policy Engine 148 for executing policies that associate users with services. The Policy Engine 148 functions to determine whether or not provisioning requests conform to defined policies and to provide correct recovery procedures in the event that a policy is violated. If an approval is needed for a provisioning request, the Policy Engine 148 interfaces with a Workflow Engine 150 to notify and obtain authorization instructions from the appropriate authorization entity, which may be, for example, one or more users having pre-defined supervisory roles.

The Workflow Engine 150 functions to execute and track transactions within the system. Such transactions may include provisioning and de-provisioning of services, user status changes, and the approval process associated with a provisioning request in the system. In preferred embodiments, users with appropriate access levels may, through a client application, query the Workflow Engine for status information relating to a transaction (such as a provisioning request) being executed by the system.

The applications services modules also include a Report Engine 152 for executing predefined reports and formatting requested information. Note that requests for reports will only come directly from users of the system or the system administrator. They will not come from other systems.

The data services modules 136 includes modules that assist other modules in interacting with directories and databases that hold the network's state and the system's configuration. The data services modules 136 may include an Information Model 154 that provides a logical view of the data in persistent storage in a manner that is independent of the type of data source that holds the data. The model abstracts the details of the stored data into more usable constructs, such as Users, Groups and Services, by adding an object-oriented layer on top of the LDAP-based data model. The model may also provide an extendable interface to allow for customized attributes that correspond to these constructs.

The data services modules 136 may also include a Meta-Data module 156 that provides an interface from which a client may discover the design of the directory schema. Meta-Data is data that defines the content of the actual data. This may be used by a client to manage the data in persistent storage with a dynamic approach.

The remote services modules 134 provide interaction with external systems for provisioning and de-provisioning services. Synchronization of service information and user information, which is the process of making sure that the information stored on the remote service and the information stored in the RPM system match and is up to date, may also be performed by the remote services modules 134.

The remote services modules 134 may include a Message Transformation module 158 that provides utilities for defining and executing conversions of messages such as add, modify, delete, and search from one format to another. This module handles message formats, rather than delivery protocols. The actual protocols used are determined at run-time, and may include, but are not limited to, Remote Access Management Protocol (RAMP), Encrypted Socket Protocol (ESP), and Directory Access Markup Language over HTTPS (DAML/HTTPS). The message transformation module 158 transforms between the data format used in the LDAP directory and the format used on the external system. Both formats are key value pairs, but the names of the keys must be mapped as part of the conversion process.

The remote services modules 134 may also include a Provisioning module 160 for providing an abstraction layer for provisioning products and services through external systems. The abstraction layer hides the protocol being used from the provisioning system. The specific protocols used to perform the provisioning, such as those described above, are preferably isolated from the client of the module. In preferred embodiments, new provisioning protocols may be added to the module without disrupting the module interface.

The remote services modules 134 also include a Synchronization module 162 that retrieves service information from external systems to keep the service information stored by the system up to date. In addition, the Synchronization module 162 may retrieve organizational information, such as organizational unit and user information. The module is preferably pre-set or configured to define the data needed, how to retrieve it, where to store it and how often to perform retrievals. The module may also define rules for resolving conflicts between information retrieved from an external system and currently stored data.

System Components

An example component view embodiment of the system is shown in FIG. 4, wherein logical applications and modules of FIG. 3 are organized into system components. A component is a self-contained and independent software entity that can be deployed onto computer and networking hardware separately from other components within the system. In the FIG. 4 embodiment, applications and modules are arranged to form an Application Server component 202, a B2B Server component 204, a Service Server component 206, a Synchronization Server component 208, a Web Server component 210 and a Workflow Server component 212. Each of these components is arranged in one of two domains, a trusted domain 214 and a demilitarized zone (DMZ) domain 216, relative to an untrusted domain 218.

A DMZ is a computer network (or a single computer) that is protected from a company's internal network (the trusted domain), but is accessible from the internet. The DMZ domain 216 contains systems that are accessible from the internet, and can access the internal network (trusted domain). The DMZ domain 216 will not typically contain any sensitive data or critical systems. The DMZ domain 216 is created so that even if a hacker breaks into the DMZ, the hacker would still have to break into the internal network from the DMZ. Although every effort is made to protect the DMZ from hackers, a security breach in the DMZ should not result in the theft or corruption of data, or in the loss of a critical system. The trusted domain, which is the internal network, is considered much more sensitive. Any intrusion into the trusted domain is considered a serious breach of security.

The Application Server component 202 is composed of modules for supporting users interacting with the system, for example, through the Web Server component 210. The Application Server component 202 is coupled to the Web Server component 210 and the Workflow Server through secure connections, such as secure remote method invocation (RMI) connections. The Application Server component 202 includes the authentication, authorization, report engine and logging modules of the application services 132 and data services modules 136 shown in FIG. 3. In preferred embodiments, the Application Server component also executes logic for the presentation of the Application Services modules, so that the Web Server component may remain as simple as possible. This also provides a security boundary for the Application modules.

In preferred embodiments, each request to the Application Server (requests from users for provisioned services) is authenticated and authorized before it is executed. At this level, only proper system credentials may be sufficient for authentication, to determine whether a valid Web Server is making the request. However, by requiring authorization of the requesting user before any request is executed, the Web Server component may remain in an untrusted domain.

The B2B Server component 204 is composed of modules for providing an interface to external systems such as another provisioning system of the type described herein, or other third-party provisioning systems that may communicate requests to the platform system.

In the illustrated embodiment, the B2B Server component 204 includes the B2B Gateway module 142 and an Authentication module (see reference character 138 in FIG. 3) for authenticating B2B requests. The interface may be provided using a secure network protocol, such as HTTPS, for encrypting data transfer and for authentication of requestors. In preferred embodiments, all requesters must be authenticated and authorized before requests can be fulfilled. The B2B Server component 204 is also coupled to the Workflow Server 212, preferably through a secure connection, such as a secure RMI connection.

The Service Server component 206 is composed of modules for providing an interface to managed resources 26 and 66, and services that issue unsolicited notices or asynchronous provisioning confirmations to the system. The Service Server component 206 may be connected to managed services resources 26 and 66, through, for example, a DAML/HTTPS connection. In addition, the Service Server component 206 may be connected to databases, such as a customer database 24, and third party service provider systems 28 and 64, through suitable connections, which may comprise HTTPS connections or vendor-specific connections.

The Service Server component 206 includes a Notification Gateway module which provides receiving logic that interacts with the Synchronization and Provisioning modules of the Synchronization Server 208 and the Workflow Server 212 components, respectively, through secure connections such as secure RMI connections. The separation of the Notification Gateway module from the Synchronization and Provisioning modules provides a security boundary between untrusted and trusted domains. The protocols used may be specific to the managed entity. In preferred embodiments, all requestors must be authenticated and authorized before passing on information to any modules in the trusted domain.

The Synchronization Server component 208 includes modules for periodically synchronizing service information between the service providers 28, 64 and a local data repository. The Synchronization Server component 208 is configured to adapt to the service provider's interfaces to extract desired information. The Synchronization Server component 208 includes the synchronization and message transformation modules of the remote services 134, the authentication, authorization, and logging modules of the applications services 132, and the data services modules 136 shown in FIG. 3.

The Web Server component 210 includes modules for providing users with a graphical interface. The Web Server component includes an Applications Presentation module, which creates Web pages for the end user, as well as the authentication module of the applications services module group 132. The Web Server component is connected to client systems 16, 52, for example, over an HTML/HTTPS connection. Preferably, all clients are authenticated when making requests to the system. For example, the Web Server may be configured to require password authentication, X.509 certificate authentication, or both, when using HTTPS.

The Workflow Server component 212 includes modules for provisioning and de-provisioning services within the system. The Workflow Server component includes the policy engine, workflow engine, logging, email, authentication and authorization modules of the applications services module group 132, as well as the data services modules 136 and the provisioning and message transforming modules of the remote services module group 134.

Deployment of System Components

The components 202–212 of the FIG. 4 embodiment may be deployed in hardware (processor or computer systems) in a variety of manners. The components may be deployed on as few processors as possible, for example, to minimize system complexity and operational cost. Alternatively, some or all of the components may be separated and distributed to separate processors to maximize computing resources. Many of the modules and applications within components can also be distributed to further maximize computing capabilities. Furthermore, some or all of the components may be configured in clusters to take advantage of load balancing algorithms and fail-over capabilities.

The responsibility of configuring the system deployment may be provided to a system administrator. Thus, applications, modules or components containing groups of applications or modules as described above may be provided to a system administrator, for example, in software form (such as on a computer readable storage medium), in hardware or firmware form (such as on circuit boards or cards to be installed in a computer system) or a combination thereof. The system administrator may then develop a deployment strategy that meets the organization's performance and security needs and deploy the appropriate modules on appropriate hardware devices to fit the desired strategy. The system administrator may be free to deploy all of the components of the system on one processor or distribute clusters of each component in almost any combination, if desired.

An example of simple deployment option is shown in FIG. 5, where the six components 202–212 of FIG. 4 are clustered onto one processor 302 comprising the Platform system. Thus, processor 302 represents a server running the provisioning system according to embodiments of the present invention described herein. The Platform Processor 302 is coupled to external systems and clients over the network 306, through a Web Server Load Balancer 308. One or more Data Server processors 304 may be coupled to the platform processor 302 for deploying the RPM Directory and RPM Database. The Data Server processors 304 include a server running a relational database server and an LDAP directory server. The FIG. 5 embodiment demonstrates a simple deployment with a clustered deployment of servers that deploy all the components of the system. The load balancing algorithms dictate which components are running on specific processors. This deployment embodiment, however, may present security risks because the components are not deployed on separate hardware in separate trusted domains, as described above.

Another example of a deployment option is shown in FIG. 6. The FIG. 6 deployment, while more complex than the deployment shown in FIG. 5, alleviates some of the security concerns associated with the FIG. 5 deployment. All components 210, 204 and 206 shown in the DMZ domain in FIG. 4 that interface to external clients and systems via the Internet may be clustered on one or more dedicated Web Server processors 402 in FIG. 6 to create a boundary between untrusted and trusted domains, where the web client is in an untrusted domain and the rest of the system components are in a trusted domain. The Synchronization Server component 208 is deployed in a separate cluster, so that communication with the service providers can be configured independently of other clusters.

In this manner, the interfaces to external clients and systems are isolated to one or more servers containing only those components of the system necessary for external interface. Other components of the system, including, but not limited to, those components that must remain secure, may reside on servers that do not interface to external clients and servers. Thus, external users of the system whose trustworthiness has not been verified are isolated from secure portions of the system, and the integrity of secure portions of the system residing on other servers within the system may be protected.

System Functional Areas

Now that the general system and various perspective views of the system have been described, including some examples of environments in which the system may operate, it may be understood that features of the system may be organized into functional areas. Some functional areas that may be incorporated into the system are given below and are merely examples of the types of functional areas the system may employ.

For example, all requirements for defining approval signatures and enforcing them may be grouped into an Approval Management functional area. As another example, an Authentication and Authorization functional area may group all requirements for user authentication to the system and the management of a user's access to functions and data within the system.

As further examples of functional areas of the system, a Business Partner functional area may group all requirements for managing business partner relationships. A Business-to-Business functional area may group all requirements for business-to-business interactions. This may include all external interfaces to partner and service subscriber systems.

An External Data Input functional area may group all requirements for incorporating current customer information into the system, such as existing users and resources. An Organization Management functional area may group all requirements for adding, modifying, and deleting organizations. A Policy Based Provisioning functional area may group all requirements for defining the provisioning of services based on attributes or a users' membership in a role, group, organizational unit, or organization.

A Report Generation functional area may group all requirements for reporting capabilities provided by the system. A Service Management functional area may group all requirements for defining services that the system may provision.

A System Administration functional area may group all requirements for configuring the system. This may include requirements for installing the system and altering its configuration parameters. A User Interface Customization functional area may group all requirements for providing a user the ability to customize a user interface. A User Management functional area may group all requirements for adding, modifying, and deleting users.

Other functional areas may be developed based on the needs of the system user.

System Operation

Figure 7B:
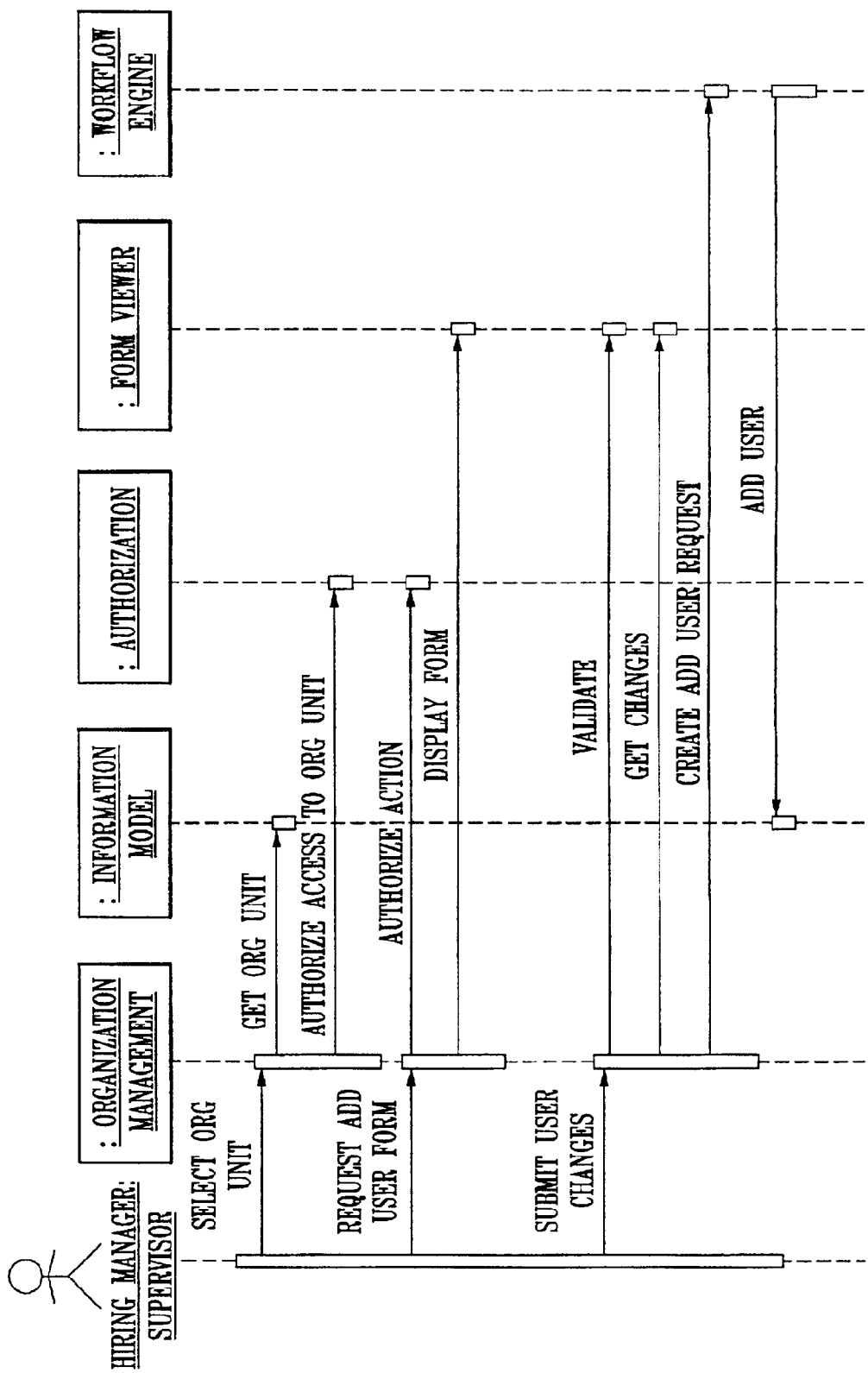
Figure 7C:
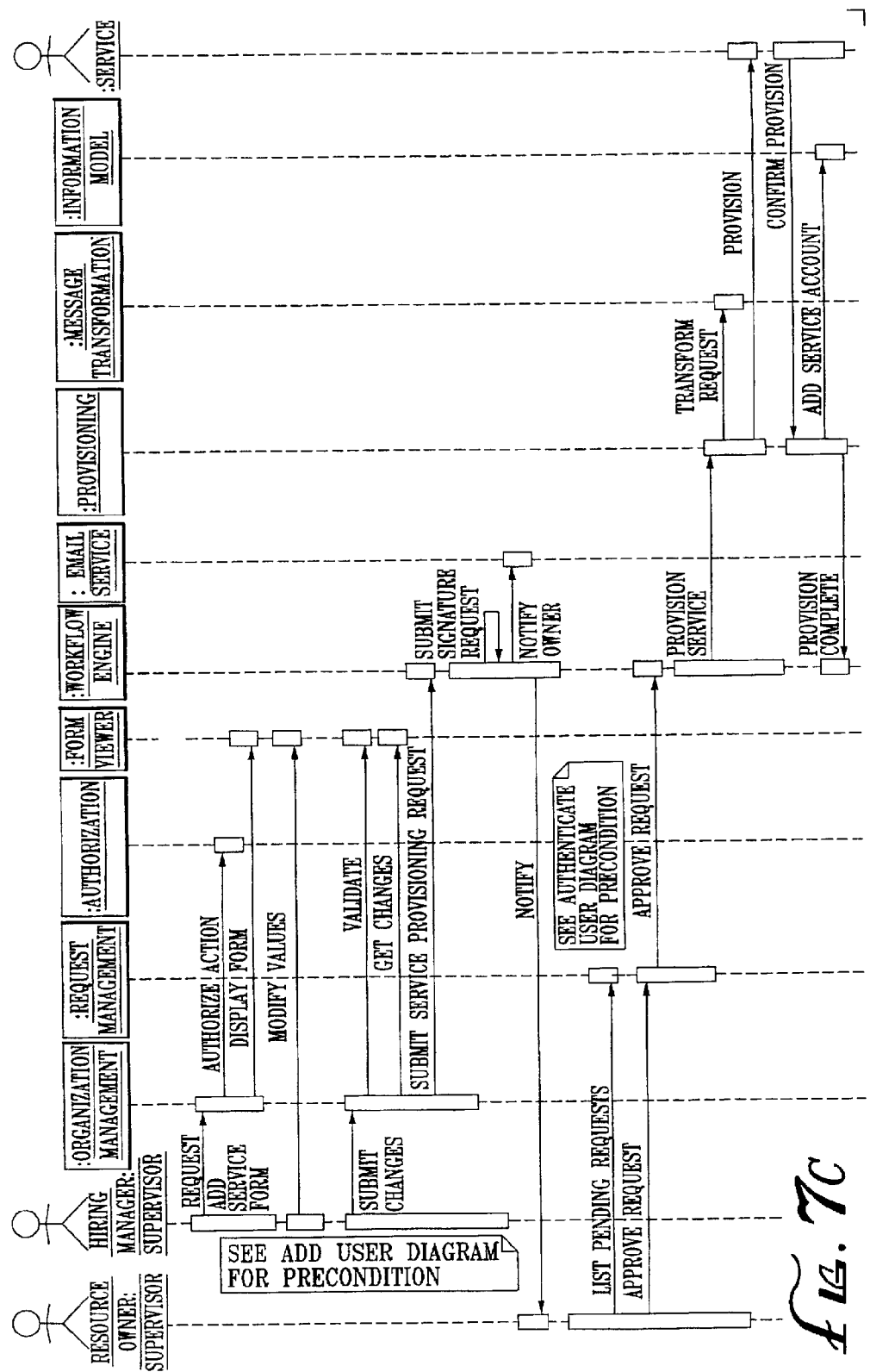
Figure 7D:
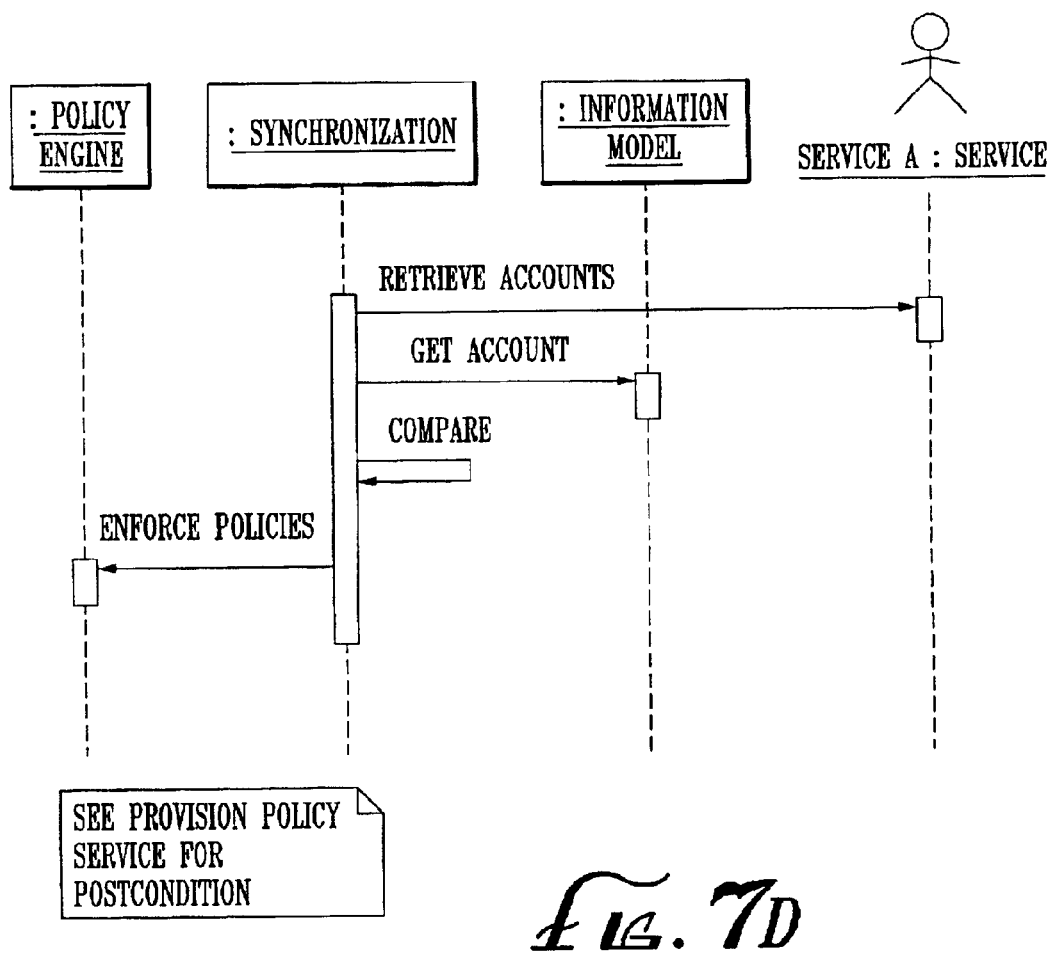

Examples of certain operations of the system are shown in the sequence diagrams of FIGS. 7A–E. FIG. 7A is a sequence diagram of interactions for implementing a user's authentication to the system. At the conclusion of the authentication, the user is presented with an application interface to perform system actions. In the illustrated embodiment, the user is presented an interface to an Organization Management application. FIG. 7B is a sequence diagram of interactions for adding a user to the system. FIG. 7C is a sequence diagram of interactions for implementing on-demand provisioning of a service for a user. FIG. 7D is a sequence diagram of interactions for synchronizing service data with a remote host and enforcing any policies that are violated by detecting changes made on the remote host.

FIG. 7E is a sequence diagram of interactions for implementing an addition of a user to the system and provisioning of services for that user based on provisioning policies. In embodiments of the present invention, user provisioning is accomplished with the RPM system described hereinabove. Unlike RBAC, which provisions users with "soft" resources (such as accounts) based on only on roles, RPM provisions users with both "hard" and "soft" resources based on policies, which are defined according to user roles and attributes.

Thus, in preferred embodiments of the present invention, the RPM system may provision a user with "soft" resources, including, but not limited to passwords, e-mail and voice mail accounts, application programs, databases, files, folders, the Internet, Web pages, organizational Intranets, and the like. Other, more non-traditional "soft" resources may include messages to third parties, digital certificates for enabling the user to access encrypted resources, the capability to order products over the Internet, the ability to order a corporate credit card, access to financial services providers, and the like. In addition, RPM may provision users with "hard" resources such as telephones, computers, cellular telephones, pagers, personal digital assistants, desks, chairs, file cabinets, and other physical components. RPM may also provide resource bundles, which are pre-packaged groupings of resources that are typically provisioned together. For example, a resource bundle may include a cellular telephone, telephone service, a pager account, voice mail, and Internet access. Another example of a bundled account may be Digital Subscriber Line (DSL) access and an Internet Service Provider (ISP) account.

Note that RPM systems according to embodiments of the present invention may also have the capability of making provisioning adjustments if a user's roles and attributes change, including de-provisioning, and especially de-provisioning all of the allocated resources once a user has left the company.

In preferred embodiments of the present invention, the RPM system provisions users with resources based on policies, which are defined based on roles and attributes. A role describes a person's responsibility within the organization, and may include roles such as a manager, secretary, system administrator, committee member, and the like. Each role has only two values. For example, a user is either a manager (a "yes" value), or he is not (a "no" value). An attribute is a characteristic or quality of a user or resource, such as "amount of time spent traveling," or "cost." In contrast to a role, each attribute may have multiple values. For example, the attribute "amount of time spent traveling" may have the values "less than 30%," "between 30% and 60%," and "greater than 60%."

Policies are written based on these roles and attributes. Because attributes can be used in addition to roles to define a policy, the task of defining the relationship between users and resources is made more efficient. Attributes can take on multiple values, and thus a single policy definition can be written in Boolean form using IF-THEN-ELSE IF statements (or the equivalent) to account for different attribute values, instead of multiple role definitions using IF-THEN statements. It should be noted that although IF-THEN-ELSE statements are presented herein for purposes of explanation only, in embodiments of the present invention any programming language and syntax capable of implementing the equivalent Boolean statements may be employed. A simple example is illustrative. Suppose that a role-based system has defined three roles as follows:

| Role No. | Definition |
| --- | --- |
| 1 | IF the user is in marketing AND the user is a manager AND the user travels less than 30% of the time, THEN provision the user with a pager; |
| 2 | IF the user is in marketing AND the user is a manager AND the user travels between 30% and 60% of the time, THEN provision the user with a cellular telephone; |
| 3 | IF the user is in marketing, THEN provision the user with access to the sales figures database; |

Now suppose that a new employee, user A, is a marketing manager that travels less than 30% of the time. Suppose also that a new employee, user B, is a marketing manager that travels between 30% and 60% of the time. The role-based system would determine that roles 1 and 3 apply to user A, and that user A should be provisioned with a pager and access to the sales figures database. The role-based system would also determine that roles 2 and 3 apply to user B, and that user B should be provisioned with a cellular telephone and access to the sales figures database.

Now suppose that a policy-based system according to embodiments of the present invention has defined two policies as follows:

| Policy No. | Definition |
| --- | --- |
| 1 | IF the user is in marketing AND the user is a manager, THEN IF the user travels less than 30% of the time, THEN provision the user with a pager; ELSE IF the user travels between 30% and 60% of the time, THEN provision the user with a cellular telephone; |

-continued

| Policy No. | Definition |
|---|---|
| 2 | IF the user is in marketing, THEN provision the user with access to the sales figures database; |

The policy-based system of would determine that roles 1 and 2 apply to user A, and that user A should be provisioned with a pager and access to the sales figures database. The policy-based system would also determine that roles 1 and 2 apply to user B, and that user B should be provisioned with a cellular telephone and access to the sales figures database.

It should be understood from the above example that embodiments of the present invention allow a single policy to be defined than covers multiple attribute values, minimizing the number of policies that need to be defined as compared to the number of roles that would have to be defined in a role-based system. In the simple example provided above, policy 1 of the policy-based system replaces roles 1 and 2 of the role-based system. With fewer policies to evaluate, less memory may be consumed. In addition, in preferred embodiments the determination of resources can be performed more quickly. In the simple example provided above, when user A is being evaluated, both IF-THEN statements in roles 1 and 2 must be evaluated before the role-based system can determine that role 1 applies to user A, but role 2 does not. In contrast, once the "IF the user travels less than 30% of the time" statement in policy 1 is found to be true, the ELSE IF statement in policy 1 can be bypassed.

The roles and attributes associated with a user, as described above, may be assigned by human resources personnel or other organizational employees prior to the user's start date. In preferred embodiments of the present invention, the provisioning of a user may be initiated by calling up a provisioning user interface (screen) on a Web browser connected to an organizational network. This screen would enable human resources personnel to input known roles and attributes. The RPM system would then search its stored policies and, based on the user's roles and attributes, determine a set of resources to be provisioned. Alternatively, human resources personnel may simply type employee information into a human resources (HR) system database, where the RPM system would automatically pull information from this database through a direct feed and begin the provisioning process. In addition, a start date or other date and time information may be entered, and the RPM system can initiate provisioning tasks when triggered by this date and time information.

The actual provisioning of resources may involve electronic communications and human interaction. For example, an e-mail might be sent to various office personnel to deliver a desk and chair to a certain office by a certain date. Another e-mail might be sent to IT personnel to deliver a computer and telephone to the office by a later date, and then enable a computer account, provide access to various applications and databases, e-mail, and voice mail by yet another date. Outside procurement services companies may also be contacted for some or all of the provisioning tasks. In addition, the provisioning of accounts maintained by an external system such as an ASP may be facilitated by communications between the RPM system and "agent" software that resides in a server within the external system. The "agent" acts as a portal through which accounts from the external system may be managed and accessed.

Once a user is provisioned with a set of resources, a list of these existing resources is maintained by the RPM system. Thereafter, if a user's roles or attributes should change, the policies are re-evaluated and a new list of resources to be provisioned are determined. This new list of resources is compared to the list of existing resources, and users are provisioned or de-provisioned according to the differences in the lists. In preferred embodiments, if a particular existing resource is also in the new list of resources, the RPM system will make no change regarding this resource, rather than de-provisioning then provisioning the resource.

Upon termination or suspension or a user, or if a user should take a leave of absence, embodiments of the present invention may also suspend the provisioning of resources, rather than de-provisioning them. For example, if a terminated user has threatened to take legal action against the company, the user's e-mail account may be suspended but not deleted, so that the user cannot access the e-mail account, but the e-mails may nevertheless be reviewed by the company in anticipation of litigation.

In preferred embodiments of the present invention, a reconciliation process is performed when the RPM system is first invoked. In reconciliation, the RPM system compares a list of currently provisioned resources with a list of resources that should have been provisioned based on the current state of each user's roles and attributes. Discrepancies between the two lists are resolved by provisioning or de-provisioning.

Although the previous example described an attribute of a user ("amount of time spent traveling"), in embodiments of the present invention the RPM system may also maintain attributes of resources. Resource attributes play a role where the provisioning process allows for a selection of resources. For example, once a user begins working at an organization, the user may be able to call up the provisioning user interface screen to request optional resources. After entering additional information, the user may be able to select optional resources, provided that the user has certain attribute values.

Continuing the present example for purposes of illustration only, suppose that user A (a marketing manager that travels less than 30% of the time, and is not automatically entitled to a cellular telephone) can nevertheless request a cellular telephone if certain other roles and attributes are satisfied. User A may call up the provisioning screen and inter a value of "Europe" for the attribute "client location." The provisioning screen may then present user A with a selection of cellular telephones to choose from. If user A selects a cellular telephone less than $200, a "cellular telephone cost" attribute having a value "less than $200" will be associated with user A, and the system may automatically provision user A with that telephone by sending an e-mail order to a cellular telephone provider, for example.

However, if the selected telephone is more than $200, such as a so-called "world phone," a "cellular telephone cost" attribute having a value "more than $200" will be associated with user A, and approval may be required. For example, an e-mail may be sent to a vice-president, providing the vice-president with access to the provisioning screen and requesting that the vice-president input the approval or disapproval of the telephone. Once this information is provided, the RPM will either order the telephone or send a denial message to the user. An example policy definition covering this example is as follows:

| Policy No. | Definition |
| --- | --- |
| 1 | IF the user is in marketing AND the user is a manager, THEN IF the user travels less than 30% of the time, THEN provision the user with a pager; IF the user's client's location is in Europe, THEN IF the cellular telephone is less than $200 Provision the user with the cellular telephone; ELSE approval from a vice-president is needed to provision the user with the cellular telephone; ELSE IF the user travels between 30% and 60% of the time, THEN provision the user with a cellular telephone; |

Other examples of resource attributes include, but are not limited to, color, features, and manufacturer.

As described above, embodiments of the present invention may require input from another person before provisioning can continue. In another example provided for purposes of illustration only, when a new employee is entered into the system, human resources personnel may enter known roles and attributes, such as the new employee's department, at which time the policy may halt the inputting of information into the provisioning screen and instead send an e-mail to the department manager, providing the department manager with access to the provisioning screen and requesting that the department manager input a cubicle or office location. Once this information is provided, human resources personnel are notified, and provisioning of that office with a desk, chair, etc. can resume. More generally, at any point in the provisioning sequence, the policy may require that another person provide some of the new employee's roles, attributes, job descriptions, etc. before provisioning can resume.

It should be understood that although the above examples describe e-mail as a means for seeking information or approval from another person, or ordering resources, other methods of communication such as providing hyperlinks to Web pages and automated ordering of resources over the Internet using online resource provider order sheets may also be employed.

As described above, in embodiments of the present invention the provisioning process may be a sequence of steps, some of which require human intervention such as providing information or authorization. An example of this sequence will now be provided. Referring to FIG. 7, a user wishing to be provisioned with one or more resources may access a provisioning user interface screen 700 from a networked computer. In embodiments of the present invention, the provisioning screen 700 may include explanatory text and boxes or fields into which information may be entered. The user may type information into the fields, or may select from a pulldown menu of fixed choices. For example, fields 702 and 704 for a user to enter his first and last name may be provided, and a pulldown menu 706 of available resources may be provided. In alternative embodiments, the provisioning screen 700 may also include fields for optional information, fields for required information that the requesting user does not know (and therefore must be provided by another person), fields for required information (such as approvals) that must be provided by another person, and the like. In preferred embodiments, however, the provisioning screen visible to the requesting user will only contain those fields for information that the user is capable of providing.

Continuing the example of FIG. 7 for purposes of illustration only, suppose that the user requests an e-mail account. In embodiments of the present invention, the RPM processes the provisioning request by sending the provisioning screen to the manager, sending an e-mail to the manager to access a particular hyperlink to view the provisioning screen, or the like. As indicated by reference character 708, the department manager may see a different provisioning screen 708 from the requesting user. For example, the provisioning screen 708 may include additional fields 710 and 712 which allows the manager to approve or disapprove the request, and, if approval is given, which department has given the approval.

Continuing the example of FIG. 7 for purposes of illustration only, if approval is given, the provisioning screen may then be made known to the IT department, who may see a different provisioning screen 714 from the department manager. For example, the provisioning screen 714 may include an additional field 716 which allows IT personnel to designate a particular mail server, which may be dependent on the department information, and which may be beyond the department manager's knowledge.

As the preceding example illustrates, in preferred embodiments of the present invention, software for controlling the optional provisioning process may establish which information is to be provided by an individual, and which individuals have approval or disapproval authority, etc. The provisioning process may also determine who can modify information, and which information cannot be modified. The provisioning process may also define what information must be added before the provisioning request can be sent to the next person. In alternative embodiments, the provisioning request may be sent back to the requesting user for additional information or the modification of existing information (i.e. the modification of a resource request). In preferred embodiments, the authorizing authority may change depending on what is entered into the request fields. Thus, there is no one process path through which this request form will flow. The process path may actually branch into different directions, depending on what information is entered into the fields of the request form. A generic name for this flow is called workflow process.

Therefore, embodiments of the present invention to provide a system and method for provisioning users based on policies defined in terms of user roles and attributes, which minimizes the number of unique roles which must be created. In addition, embodiments of the present invention to provide a system and method for provisioning users based on policies which allow both "soft" and "hard" resources to be provisioned, as well as resource bundles.

Embodiments of the present invention also provide a system and method for provisioning users based on policies which can take various process paths that are established as a result of the entry of user parameters, and may require information or authorization to be provided by another person.

What is claimed is:

1. A method for provisioning users with resources, the method comprising the steps of:

establishing a set of attributes, organizational information, and user roles;

defining a plurality of resource provisioning policies based on selected attributes, organizational information, and user roles;

receiving attribute information, organizational information, and user role information for a particular user, resource, or database;

determining which resource provisioning policies are applicable to the user based on the received user role information, organizational information, and attribute information; and provisioning the user with resources based on the applicable resource provisioning policies, the resources including at least one hard resource;

wherein said plurality of resource provisioning policies are defined utilizing decision statements that allow irrelevant steps to be bypassed.

2. A method as recited in claim 1, the user roles comprising a yes value and a no value, the attributes comprising multiple non-binary values.

3. A method as recited in claim 2, further including the step of reconciling resources by comparing resources currently provisioned to the user with a list of resources that should be provisioned to the user based on the applicable resource access policies, and identifying any differences.

4. A method as recited in claim 3, further including the step provisioning or de-provisioning resources to the user based on the differences detected by reconciliation.

5. A method as recited in claim 2, further including the step of de-provisioning the user with some or all of the user's allocated resources if the user is terminated, suspended, or placed on leave.

6. A method as recited in claim 2, further including the steps of:

receiving timing information related to the timing of the provisioning or resources; and provisioning the user with resources at a certain time specified by the timing information.

7. A method as recited in claim 2, the attributes comprising user attributes and resource attributes.

8. A method as recited in claim 2, further including the step of provisioning the user with "hard" resources and "soft" resources.

9. A method as recited in claim 2, further including the step of provisioning the user with resource bundles.

10. A method as recited in claim 2, the step of provisioning the user with resources comprising communicating requests for the resources to applications or persons.

11. A system for provisioning users with resources, the system comprising:

memory for storing a set of attributes, organizational information, and user roles, a plurality of resource provisioning policies based on selected attributes, organizational information, and user roles, and attribute information and user role information for a particular user or resource; and one or more processors coupled to the memory and an organizational network, the processors programmed for determining which resource provisioning policies are applicable to a particular user based on the stored user role information, organizational information, and attribute information, and provisioning the user with resources based on the applicable resource provisioning policies, wherein the resources include at least one hard resources;

wherein the plurality of resource provisioning policies utilize decision statements that allow irrelevant steps to be bypassed.

12. A system as recited in claim 11, the user roles having a yes value and a no value, the attributes comprising multiple non-binary values.

13. A system as recited in claim 12, the one or more processors further programmed for reconciling resources by comparing resources currently provisioned to the user with a list of resources that should be provisioned to the user based on the applicable resource provisioning policies, and identifying any differences.

14. A system as recited in claim 13, the one or more processors further programmed for provisioning or de-provisioning resources to the user based on the differences detected by reconciliation.

15. A system as recited in claim 12, the one or more processors further programmed for de-provisioning the user with some or all of the user's allocated resources if the user is terminated, suspended, or placed on leave.

16. A system as recited in claim 12, the one or more processors further programmed for:

receiving timing information related to the timing of the provisioning or resources; and provisioning the user with resources at a certain time specified by the timing information.

17. A system as recited in claim 12, the attributes comprising user attributes and resource attributes.

18. A system as recited in claim 12, wherein the user may be provisioned with "hard" resources and "soft" resources.

19. A system as recited in claim 12, wherein the user is provisioned with resource bundles.

* * * * *